(12) United States Patent
Tye et al.

(10) Patent No.: US 6,369,214 B1
(45) Date of Patent: Apr. 9, 2002

(54) METHOD OF DISPERSING A PIGMENT

(75) Inventors: Anthony J. Tye, Waterville, OH (US); Gerald L. Bajc, Hackettstown, NJ (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/410,912

(22) Filed: Sep. 30, 1999

(51) Int. Cl.[7] .............................. C08B 3/00; C08B 5/00; C08L 1/00; C08L 1/08; C08L 1/10
(52) U.S. Cl. ..................... 536/32; 536/124; 106/162.7
(58) Field of Search ................. 536/32, 124; 106/162.7

(56) References Cited

U.S. PATENT DOCUMENTS

| | | | |
|---|---|---|---|
| 5,256,453 A | 10/1993 | Heithorn et al. | ............ 427/415 |
| 6,229,007 B1 * | 5/2001 | Tye et al. | |

FOREIGN PATENT DOCUMENTS

| | | | |
|---|---|---|---|
| DE | 40 01 222 A | 7/1990 | ........... C09D/17/00 |
| EP | WO 86 06081 | 10/1986 | ............. C08B/3/22 |
| EP | WO 99 40120 | 8/1999 | ............. C08B/3/06 |

* cited by examiner

Primary Examiner—Gary Geist
Assistant Examiner—Everett White
(74) Attorney, Agent, or Firm—Mary E. Golota

(57) ABSTRACT

Disclosed are a method of dispersing a pigment, a pigment dispersion, a coating composition comprising said pigment dispersion, an method of making a coating composition, and a method of improving the appearance of a coating composition. The pigment dispersion of the invention requires at least one pigment subjected to an action to decrease the average particle size of the pigment in the presence of an amine functional cellulose ester resin. The amine functional cellulose ester resins comprise at least one repeat unit of the structure:

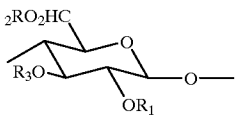

wherein $R_1$, $R_2$, and $R_3$ are selected independently from the group consisting of hydrogen, $R_4C=O$, and

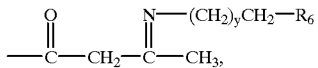

wherein at least one of $R_1$, $R_2$, and $R_3$ is hydrogen, at least one of $R_1$, $R_2$, and $R_3$ is $R_4C=O$, and at least one of $R_1$, $R_2$, or $R_3$ have the structure

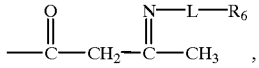

$R_4$ is selected from the group consisting of $C_1$–$C_{20}$ alkyl groups, $C_1$–$C_{20}$ phenyl groups, $C_1$–$C_{20}$ napthyl groups, and $C_1$–$C_{20}$ alkenyl groups, L is a divalent linking group and $R_6$ is selected from the group consisting of H and compounds having at least one secondary amine group, tertiary amine group, and mixtures thereof.

12 Claims, No Drawings

METHOD OF DISPERSING A PIGMENT

FIELD OF THE INVENTION

The present invention provides a method of dispersing a pigment, a pigment dispersion, a coating composition comprising said pigment dispersion, an method of making a coating composition, and a method of improving the appearance of a coating composition. The pigment dispersion of the invention requires at least one pigment subjected to an action to decrease the average particle size of the pigment in the presence of an particular amine functional cellulose ester resin.

BACKGROUND OF THE INVENTION

Coatings applied to surfaces typically serve decorative and/or protective functions. This is particularly so for automotive finishes, which must provide an esthetically appealing appearance while simultaneously meeting and maintaining rigorous performance and durability requirements. As used herein, "automotive coating or finish" encompasses both original equipment (OEM) coatings and refinish coatings, but especially to refinish coatings, the later term referring to coatings which are applied after the car has left the manufacturer, usually for repair purposes. It will be appreciated that refinish coatings often have different application and performance parameters.

Pigments are used in coatings to provide decorative and/or protective functions. As used herein, "pigment" refers to a fine, insoluble white, black, or colored material, typically suspended in a vehicle for use in a paint or ink. The term "pigment" may also include effect pigments such as micas, metallic pigments such as aluminum, opalescent pigments, and the like.

Dry pigments comprise a mixture of primary particles, aggregates, and agglomerates that must be wetted and de-aggregated before dispersion forces can take fall effect and enable the production of a stable, pigmentary dispersion in the medium of choice. Aggregates, or primary pigment particles joined face-to-face, must be reduced to their fundamental primary particle. An ideal dispersion consists of a homogeneous suspension of primary particles. See *Organic Pigments, Federation Series on Coatings Technology, $2^{nd}$ Edition*, Lewis, P. October 1988, Revised March 1995, pgs. 39–41, hereby incorporated by reference.

Although pigments are acknowledged as a required component in many coatings, their presence may be a possible contributing factor to a variety of problems in liquid coatings and/or dry paint films. Examples of coatings/paint film defects thought to be attributable to pigments include: undesirable gloss due to aggregates, blooming, pigment fading, pigment flocculation and/or settlement, separation of pigment mixtures, 'pigment shock' in millbases, instability in pigment suspensions, brittleness, moisture susceptibility, fungal growth susceptibility, and/or thermal instability. See *Physical-Chemical Aspects of Pigment Applications, Surface Coating Reviews*, Guthrie, James T., and Lin, Long, Oil & Colour Chemists' Association, 1994, Sections 4.3.1–4.3.2, hereby incorporated by reference.

It has been recognized that the level of dispersion in a particular pigment containing coating composition affects the application properties of the wet composition as well as the optical properties of the cured film. Improvements in dispersion have been shown to result in improvements in gloss, color strength, brightness, and gloss retention. *Dispersion—the neglected parameter. JOCCA*, W. Carr, 65, 373 (1982).

The prior art has long sought improved pigment dispersions for use in coating compositions, particularly with respect to pigments that are difficult to disperse such as carbon black and transparent oxides. Topcoat finishes require a high quality of color depth and richness, especially with pigments such as carbon black and the like. Such high quality of color depth and richness, known as "jetness" with respect to carbon black, has been difficult to obtain in an efficient and cost effective manner with prior art dispersants and dispersion processes. "Jetness" as used herein refers to a clean looking color with blue undertones. In addition, poor dispersion, especially of carbon black pigments, is sometimes observed as color drift, loss of adhesion at interface, and/or oily appearance. The difficulty in dispersing carbon black is thought to be due to the large surface area and acidic nature of the carbon black pigment particles.

The use of cellulose esters in organic solvent borne coatings has been known to impart desired properties such as improved pigment dispersions, improved metallic flake orientation, improved solvent release, and higher gloss coatings. They are also known to function as rheology control agents in solvent borne coating formulations.

U.S. Pat. No. 3,959,193 discloses a combination of an aryl sulfonamide-formaldehyde resin and film forming material, such as cellulose acetate butyrate, which may further include a surfactant, such as a non-ionic surfactant including, for example, an alkylarylpolyether, as a "universal" dispersant for resin additives, such as pigment materials. The composition generally includes 40 to 90 weight percent of any of various types of additives, including pigments.

U.S. Pat. No. 5,521,304 provides water soluble or water dispersible cellulose acetoacetate esters prepared by contacting a cellulose material with diketene, an alkyl acetoacetate, 2,2,6-trimethyl-4H-1,3-dioxin-4-one or a mixture thereof and a carboxylic anhydride in a solvent system comprising lithium chloride plus a carboxamide. Compositions containing the cellulose acetoacetate esters are disclosed to be useful for coating applications.

Amine-containing cellulose esters, eg, the acetate N,N-diethylaminoacetate and propionate morpholinobutyrate have been suggested for use in controlled-release, rumen-protected feed supplements for ruminants. Such esters are prepared by the addition of the appropriate amine to the cellulose acylate crotonate ester or by replacement of the chlorine on cellulose acylate chloroacetate esters with amines. However, such amine containing cellulosic materials are not taught to be useful in coating compositions nor do they suggest the particular compositions of the invention. They lack an enamine structure, hydroxyl groups and the use of mixed acetate/butyrate esters.

Eastman Chemical Products, Inc's Publication No. X-263A, December, 1986, pgs. 2–3, discusses the possible reactions of acetoacetylated polymers. The carbonyl group of the acetoacetylated polymers is said to chelate with metals such as zinc, tin, lead, aluminum, copper and zirconium. Polyvalent cations are taught to be useful for crosslinking purposes. In addition, the preparation of enamines by the reaction of amines with carbonyl groups is taught. Diamines are shown to crosslink acetoacetylated polymers.

Despite these prior art attempts, there still exists a need for improved pigment dispersion, especially with respect to the dispersion of certain pigments intended for use in topcoat finishes.

Accordingly, it is desirable to obtain an improved dispersion with respect to pigmented coating compositions. It is further desirable to obtain such improved dispersion with an agent that is economical and easily obtained. More particularly, it is desirable to obtain a dispersant for use with pigments, especially hard to disperse pigments such as carbon black, which would provide coatings having an improved appearance, especially as to color and/or jetness, when pigments dispersed with such a dispersant are incorporated into the coating.

SUMMARY OF THE INVENTION

The invention provides a method of dispersing a pigment in a, resin, wherein one or more pigments are ground, i.e., are subject to a means for reducing and maintaining the average particle size of the pigment, in the presence of an amine functional cellulose ester resin comprising at least one repeating unit of the structure:

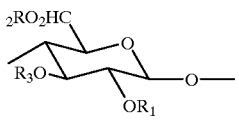

wherein $R_1$, $R_2$, and $R_3$ are selected independently from the group consisting of hydrogen, $R_4C=O$, and

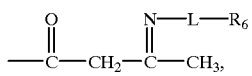

wherein at least one of $R_1$, $R_2$, and. $R_3$ is hydrogen, at least one of $R_1$, $R_2$, and $R_3$ is $R_4C=O$, and al least one of $R_1$, $R_2$, and $R_3$ is

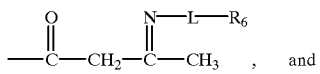, and $R_4$ is selected from the group consisting of $C_1$–$C_{20}$ alkyl groups, $C_1$–$C_{20}$ phenyl groups, $C_1$–$C_{20}$ napthyl groups, and $C_1$–$C_{20}$ alkenyl groups, $R_6$ is selected from the group consisting of H and groups having at least one secondary amine group, tertiary amine group, and mixtures thereof, and L is a divalent linking group having from 1 to 20 carbons atoms and from 0 to 10 heteroatoms selected from the group consisting of oxygen, nitrogen, and mixtures thereof.

Finally, the invention discloses the pigment dispersion resulting from said method, a coating composition comprising said pigment dispersion, a method of making a coating composition having an improved appearance and a method of improving the appearance of a coating composition.

DETAILED DESCRIPTION OF THE INVENTION

Pigments dispersions of the instant invention require that at least one pigment be subjected to an action to decrease the average particle size of the pigment. As used herein, "pigment" refers to a fine, insoluble white, black, or colored material, typically suspended in a vehicle for use in a paint or ink. The term "pigment" may also include effect pigments such as micas, metallic pigments such as aluminum, opalescent pigments, and the like. Preferred pigments for use herein are carbon black pigments and transparent oxides, especially iron oxides. Carbon black pigments are most preferred, especially those having an acidic surface.

Dry pigments comprise a mixture of primary particles, aggregates, and agglomerates that must be wetted and de-aggregated before dispersion forces can take full effect and enable the production of a stable, pigmentary dispersion in the medium of choice. Aggregates, or primary pigment particles joined face-to-face, must be reduced to their fundamental primary particle. An ideal dispersion consists of a homogeneous suspension of primary particles. See *Organic Pigments, Federation Series on Coatings Technology*, $2^{nd}$ *Edition*, Lewis, P. October 1988, Revised March 1995, pgs. 39–41, hereby incorporated by reference.

The pigment desired to be dispersed is subject to an action which decreases the average particle size of the pigment, in the presence of the amine functional cellulose ester of the invention.

Such actions may be referred to as grinding or dispersion. The desired action may be accomplished by the use of grinding and dispersion equipment known to those in the art. Examples include, but are not limited to, ball mills, sand mills, vertical mills, horiztonal mills, shaker mills, and the like.

Pigments are generally ground to a certain "fineness" of grind. Fineness of grind is often measured by the absence of "seeds" on a grind gauge, tint strength, or absence of pigment flocculation upon application. Encapsulation of the ground pigment particle is believed to prevent reagglomeration. Suitable end point measurements of the average pigment particle size are at least__microns, more preferably from__to__, most preferably to 0 to 1 microns.

The at least one pigment must be subjected to the grinding action in the presence of a particular amine functional cellulose ester resin. This amine functional cellulose ester resin is the reaction product of a cellulose ester comprising at least one acetoacetyl group and an amine functional compound comprising at least one primary amine.

As used herein, the term "acetoacetyl" group refers to

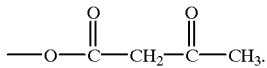

The terms "acetoacetonate" and "acetoacylate" are intended to be equivalent to and interchangeable with "acetoacetyl".

The acetoacetyl group may be obtained via the direct acetoacylation of raw cellulose as described in U.S. Pat. Nos. 5,292,877, 5,420,267, 5,521,304, and 5595,591 all of which are hereby incorporated by reference. These patents disclose water soluble or water dispersible cellulose acetoacetate esters prepared by contacting a cellulose material with diketene, an alkyl acetoacetate, 2,2,6-triemethyl-4H-1,3-dioxin-4-one or a mixture thereof and a carboxylic anhydride in a solvent system comprising lithium chloride plus a carboxamide.

Alternatively, the required cellulose acetoacetate ester may be obtained via the acetoacylation of previously esterified cellulose material.

Cellulose esters are known in the art and are commercially available from Eastman Kodak of Kingsport, Tenn. and Bayer of Pittsburg, Pa. Suitable cellulose esters for use in the instant invention are those resulting from the reaction of cellulose with organic acids, anhydrides, and acid chlorides. Methods for making cellulose esters are discussed in *Cellulose Esters, Organic*, Encyclopedia of Polymer Science and Engineering, Vol. 3, pgs, 158–181

Suitable cellulose esters for use in the instant invention are those having the following structure:

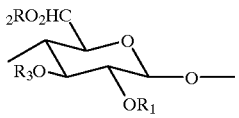

wherein $R_1$, $R_2$, and $R_3$ are selected independently from the group consisting of hydrogen and $R_4C=O$; $R_4$ is selected from the group consisting of $C_1$–$C_{20}$ alkyl groups, $C_1$–$C_{20}$ phenyl groups, $C_1$–$C_{20}$ napthyl groups, and $C_1$–$C_{20}$ alkenyl groups; and at least one of $R_1$, $R_2$, and $R_3$ is H. Preferably, the remaining $R_1$, $R_2$, and $R_3$ that are not H are different. Preferred for use as $R_4$ are the $C_1$–$C_{20}$ alkyl groups, especially the $C_1$–$C_{10}$ alkyl groups, and most preferably the $C_1$–$C_6$ alkyl groups. Most preferred cellulose esters are mixed cellulose esters such as cellulose acetate butyrate (CAB) and cellulose acetate propionate (CAP).

Cellulose esters suitable for use in the instant invention may also be characterized by particular physical and/or performance parameters such as the number of acyl groups per repeating unit, acyl chain unit length, and the degree of polymerization or molecular weight (number average). In general, suitable performance and/or physical parameters are a viscosity of from 0.01 to 20 sec, (per ASTM D817 (Formula A) and D 1343) a % Acetyl of from 0.6 to 20, more preferably from 2 to 14, (per ASTM D817), a % butyryl of from 17 to 53, more preferably from 35 to 53, (per ASTM D817), a % hydroxyl of from 0.8 to 5.0, more preferably from 1.0 to 2.0, a $T_g$ of from 50 to 200 degrees C., more prefereably from 80 to 135 degrees C., and a number average molecular weight value of from 10,000 to 70,000, more preferably from 15,000 to 40,000, based on a polystyrene equivalent molecular weight determined using size exclusion chromatography.

Suitable cellulose esters include those commercially available from Eastman Chemicals, i.e., CAB 551-0.01, CAB 531-1, CAB-381-0.5 and CAB-381-2.

The necessary acetoacetate group may be placed on a suitable cellulose ester such as described above via reaction with a compound containing an acetoacetate group. Examples of such compounds are alkyl acetoacetates having alkyl groups with from 1 to 20 carbons, preferably 1 to 10 carbons and most preferably from 1 to 6 carbons. Examples of suitable alkylacetoacetates are tert-butyl acetoacetate, methyl acetoacetate, ethyl acetoacetate and the like. Preferred acetoacetate group-containing compounds are tert-butyl acetoacetate.

The desired cellulose ester resin is modified with from 0.5% to 10% alkyl acetoacetate, based on the total weight of the cellulose ester resin. More preferably from 0.5 to 5.0%, and most preferably from 0.5 to 2.0% of alkyl acetoacetate is used, based on the total weight of the cellulose ester resin. It will thus be appreciated that some repeating units of the total cellulose ester resin may not comprise any R1 or R2 or R3 groups which have been modified with the acetoacetate group. However, from 0.5 to 10%, more preferably from 0.5 to 5.%, and most preferably from 0.5 to 2.0% of the total weight of the cellulose ester resin will have sites wherein a hydroxyl group has been replaced with an acetoacetate group.

Methods of incorporating the acetoacetate group into the cellulose ester include transesterification as described below and direct reaction of a hydroxyl group with a diketene.

A preferred method of incorporating the acetoacetate group into a suitable cellulose ester requires incorporation of a commercially available cellulose ester and a high boiling point, good cutting solvent such as ethyl 3-ethoxypropionate (EEP), PM acetate, EXXATE solvents and the like. Most preferably, ethyl 3-ethoxypropionate is used. After removal of water, an alkyl acetoacetate is added along with additional EEP. The resultant acetoacetylated cellulose ester is collected along with removal of the alkyl alcohol.

The acetoacetate group-containing cellulose ester is reacted with at least one amine functional compound to provide the amine functional cellulose ester resin of the invention. Suitable amine functional compounds will comprise at least one primary amine group. More preferably, the amine functional compounds will comprise at least one or more additional amine groups selected from the group consisting of secondary amine groups and tertiary amine groups, and mixtures thereof. Amines containing both a primary amine group and a tertiary amine group, as well as those containing a primary amine group, a secondary amine group and a tertiary amine group are most preferred.

Examples of suitable amine functional compounds for use herein include N-methylethylenediamine; N-ethylethylenediamine; N,N-diethylethylenediamine; N,N-dibutylethylenediamine; N-methyl, 1,3-propanediamine; N-propyl, 1,3-propanediamine; N-isopropyl, 1,3-propanediamine; 3-dimethylaminopropylamine; 3-diethylaminopropylamine; 3-dibutylaminopropylamine; N,N,2,2-tetramethyl-1,3-propanediamine; N-cyclohexyl-1,3-propanediamine; 2-(2-aminoethylamino) ethanol; 2-(2-aminoethyl)-1-methylpyrrolidine; 1-(2-aminoethyl)pyrrolidine; 1-(2-aminoethyl)piperidine; 1-(2-aminoethyl)piperazine; 4-(2-aminoethyl)morpholine, and mixtures thereof. Preferred amine functional compounds are 1-(2-aminoethyl)piperazine and 4-(2-aminoethyl) morpholine. A most preferred amine functional compound is 1-(2-aminoethyl)piperazine.

The amine functional compound will be used in the reaction with the acetoacetate functional cellulose ester in an amount such that all of the acetoacetate groups will be amine functionalized. At least 95% by weight of the acetoacetate groups will be modified with the amine functional group, preferably at least 98%, and most preferably 100%, based on the total weight of the acetoacetate groups present in the cellulose ester resin.

Thus, from 0.5 to 10% by weight of amine functional compound should be used, based on the total weight of acetoacetylated cellulose ester. More preferably, from 0.5 to 5.0% by weight should be used and most preferably from 0.5 to 2.0% by weight, based on the total weight of acetoacetylated cellulose ester.

Accordingly, the amine functional cellulose ester resin of the invention is characterized by a structure having at least one repeat unit:

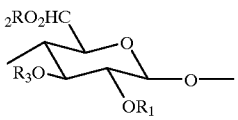

wherein $R_1$, $R_2$, and $R_3$ are selected independently from the group consisting of hydrogen, $R_4C=O$, and

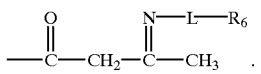

At least one of $R_1$, $R_2$, and $R_3$ is hydrogen. At least one of $R_1$, $R_2$, and $R_3$ is $R_4C=O$, and preferably at least two of $R_1$, $R_2$, and $R_3$ is $R_4$ C=O. At least one repeat unit in the instant resin will have at least one of $R_1$, $R_2$, or $R_3$ groups being

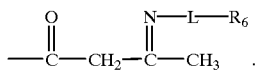

Most preferably, at least 0.5% by weight of the total weight of the amine functional cellulose ester will be of $R_1$, $R_2$, or $R_3$ groups having the structure:

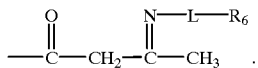

It will thus be appreciated that some individual repeating units of the total resin, may not comprise any $R_1$, $R_2$, or $R_3$ groups having the structure

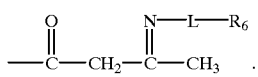

However, the invention requires only that from 0.5 to 10% by weight of the total polymer, more preferably 0.5 to 5.0% and most preferably 0.5 to 2.0% be comprised of $R_1$, $R_2$, or $R_3$ groups having the structure

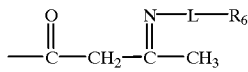

based on the total weight of the polymer.

In the above formula, $R_4$ is selected from the group consisting of $C_1$-$C_{20}$ alkyl groups, $C_1$-$C_{20}$ phenyl groups, $C_1$-$C_{20}$ napthyl groups, and $C_1$-$C_{20}$ alkenyl groups. Preferably $R_4$ is selected from the group consisting of $C_1$-$C_{20}$ alkyl groups, and most preferably is selected from the group consisting of $C_1$-$C_6$ alkyl groups.

$R_6$ is selected from the group consisting of H and compounds having at least one amine group selected from the group consisting of secondary amine groups, tertiary amine groups and mixtures thereof. Preferably $R_6$ will be selected from the group of compounds having at least one amine group selected from the group consisting of secondary amine groups, tertiary amine groups and mixtures thereof Most preferably, $R_6$ will be a secondary or tertiary amine group.

L is a divalent linking group having from 1 to 20 carbons atoms and from 0 to 10 heteroatoms selected from the group consisting of oxygen, nitrogen, and mixtures thereof. Illustrative examples of suitable L groups are aliphatic or cycloaliphatic linking groups of from 1 to 20 carbons, aromatic linking groups of from 1 to 10 carbons, and mixtures thereof. Preferred L groups include aliphatic or cycloaliphatic groups of from 2 to 10 carbons having from 0 to 5 heteroatoms.

The at least one pigment may additionally be ground in the presence of other polymeric resins. Examples of suitable binders include acrylic resins, urethane resins, polyester resins, epoxy resins and the like. Particularly suitable binders for use in the pigment dispersions herein are polyesters and acrylics, with polyesters being most preferred. A particularly preferred example of a suitable polyester resin will comprise the copolymerization product of trimethylol propane, neopentylglycol, adipic acid, and isopthalic acid and will have a number average molecular weight of from 2100 to 2800, and a hydroxyl equivalent weight of from 450 to 700.

In a particularly preferred embodiment, the pigment will be ground in the presence of the amine functional cellulose ester resin of the invention and one or more resins such as a polyester resin and then further admixed with additional solvent, binder and/or additives to provide the desired pigment dispersion.

Additional resins, solvents and additives known in the art may be further added to the pigment dispersion.

Pigment dispersions or pastes may be defined as compositions containing at least 0.2% by weight of pigment, more preferably at least 5% by weight of pigment, more preferably from 5 to 50% by weight of pigment, based on the total weight of the composition.

When used in pigment pastes, the amine functional cellulose esters of the invention will typically be used in an amount of from 2 to 15, preferably from 5 to 10, and most preferably from 7 to 8% by weight, based on the total weight of the pigment paste.

Examples of coating compositions in which the instant pigment dispersions may be used include coating compositions include primers, basecoats, and/or clearcoats which are one component, two component or multicomponent systems and may include OEM coatings and refinish coatings. Basecoats are especially preferred, most preferably one or two component basecoats used for refinish applications.

Those of skill in the art will appreciate that such coatings may be used over a variety of substrates such as metal, plastic, previously painted substrates, and mixtures thereof, and may be subjected to a variety of curing schemes including ambient cure, elevated temperature cures, and /or radiation.

This invention can be further illustrated by the following examples of preferred embodiments thereof, although it will be understood that these examples are included merely for purposes of illustration and are not intended to limit the scope of the invention unless otherwise specifically indicated. The starting materials are commerically available unless otherwise noted. All percentages are by weight unless otherwise noted.

EXAMPLES

Example 1

A 5-liter, 3-necked round-bottom flask was fitted with an agitator, thermocouple probe, inert gas inlet, reflux condenser, Dean-Stark distillation receiver and heating mantle. The flask fitted was charged with 944.5 g of Eastman Chemical's CAB #551.01 and 404.8 g of ethyl 3-ethoxypropionate (EEP), with an additional 25 g of EEP in the distillation receiver. Water was removed by heating and stirring under nitrogen to a temperature of 158° C. and draining off about 9.3 ml water from the distillation receiver. After heating to 167° C. to refill the distillation receiver with EEP, the temperature was lowered to about 140° C. and a mixture of 18.9 tert-butyl acetoacetate and 5.0 g. EEP added over 30 minutes. About 8 ml tert-butanol distilled into the receiver. The temperature was raised to 150° C. and a total amount of about 12.0 g of a combination of liquid and crystallized tert-butanol was collected.

A mixture of 405 g xylene and 390 g butyl acetate was added to the flask and the temperature reduced to 60° C. before dropping in 15.1 g of aminoethylpiperazine. The temperature was held at 60° C. for an additional three hours, then 1336 g of methyl isobutyl ketone was added before cooling.

The product was an amber liquid (color: Gardner 6) with a measured solids level of 30.05% and Gardner/Holdt viscosity of 132.5 centistokes.

Example 2

Heat Age Test

The following samples A and B were placed in half-pint cans and held at 140° F. for 16 hours and then compared to a set of samples left at room temperature for 16 hours.

TABLE

| Sample A | |
|---|---|
| Polyester Resin | 20.0 grams |
| Eastman CAB | |
| CAB 551-0.01 | 23.6 grams |
| Butyl Acetate | 76.4 grams |
| Sample B | |
| Polyester Resin | 20.0 grams |
| modified CAB of example 1 | 32.96 |
| Solvents for samples A & B: | 20.6 |
| Toluene | 41.3 |
| Methyl Ethyl Ketone | 38.1 |

Viscosity in a Ford #4 cup was taken before and after heat age on both heat age sample and room temperature sample. Viscosity did not change from heat-age samples when compared to room temperature samples.

A grind gage (Hegman) was taken before and after heat age on both heat age samples and room temperature sample. All samples had a 0 micron or 8 Hegman on the Hegman grind gage.

No color change was seen in any samples from heat-age when compared to room temperature samples.

Example 6

A shaker grind of each of the following formulas were made using 1/8 inch steel shot at a 2/3 volume load. These were on the shaker until a 5-micron or less Hegman grind was obtained. These formulas were further let down to a final spray formula. These samples were tested for jetness when sprayed at 50 psi from a conventional JGA with 30 (1.3cm) tip size then topcoated with commerically available BASF clearcoat DC88.

| (grams) | A | B | C | D | E | F |
|---|---|---|---|---|---|---|
| CAB 551-0.01 | 11.6 | 12.0 | 12.4 | — | — | — |
| Butyl Acetate | 37.7 | 38.9 | 40.2 | — | — | — |
| Solsperse 24000SC | 4.0 | 2.23 | — | 4.0 | 2.23 | — |
| Solsperse 5000 | 2.3 | 1.11 | — | 2.3 | 1.11 | — |
| Modified CAB of Example 1 | — | — | — | 16.2 | 16.8 | 17.4 |
| Carbon Black Pigment | 8.4 | 8.6 | 8.9 | 8.4 | 8.6 | 8.9 |
| Xylene | 6.5 | 6.6 | 6.8 | 6.5 | 6.6 | 6.8 |
| Polyesyer Resin[1] | 14.1 | 14.5 | 15.1 | 14.1 | 14.5 | 15.1 |
| Xylene | 15.5 | 15.9 | 16.5 | 15.5 | 15.9 | 16.5 |
| EKTAPRO EEP | — | — | — | 2.2 | 2.3 | 2.4 |
| Toluene | — | — | — | 4.6 | 4.6 | 4.8 |
| Methyl Ethyl Ketone | — | — | — | 4.1 | 4.2 | 4.4 |

[1]polyester resin of Trimethylolproprane, neopentyl glycol, adipic acid and isopthalic acid, having a number average molecular weight of from 2100 to 2800, and a hydroxyl equivalent weight of from 500 to 700.

The above samples were further let down according to the following formula:

| Eastman CAB 381-2 BP | 3.6 grams |
|---|---|
| Butyl Acetate | 11.9 grams |
| Isopropanol | 2.0 grams |
| Methyl Isobutyl Ketone | 5.7 grams |
| Polyester Resin[1] | 16.9 |
| Xylene | 27.3 |
| BYK 300 | 0.2 |
| Sample Formula [A, B, C, D, E, F] | 32.9 |

Formula D (with MODIFIED CAB) was more jet than A (without MODIFIED CAB), Formula E (with MODIFIED CAB) with more jet than B (without MODIFIED CAB), and F (with MODIFIED CAB) was more jet than C (without MODIFIED CAB). When absolute comparisions for jetness were made the ranking was D>A≧E>B>F>C.

Example 7

The following formulas: Sample A (without the amine functional cellulose ester resin of Example 1) and Sample B (with the the amine functional cellulose ester resin of Example 1) were milled 44 hours on a steel shot Ball Mill. The temperature was maintained at less than 110° F. The samples were then let down further to a sprayable product and topcoated with commerically available BASF DC88. These were sprayed at 50 psi with a conventional JGA with 30 tip size over 400 grit sanded and cured OEM car parts. These parts were then tested in humidity cabinets maintained at 100° F. with 100% related humidity. These panels were then tested with an X adhesion. [10 best, O worst and failure at a 6 rating] These panels were tested initially, at 24 hours, at 48 hours, 96 hours, and 240 hours or until failure was reached.

| | A | B |
|---|---|---|
| Mod. CAB Example 1 | — | 19.4 |
| Unmod. CAB 551-0.01 | 11.6 | — |
| Butyl Acetate | 37.4 | — |
| Solsperse 24000 | 5.5 | 4.2 |
| Solsperse 5000 | 2.7 | 2.7 |
| Carbon Black Pigment | 8.2 | 8.2 |
| Xylene | 6.3 | 6.3 |
| Polyester Resin | 13.8 | 13.8 |
| Xylene | 15.1 | 15.1 |
| EKTOPRO EEP | — | — |
| Toluene | — | 5.2 |
| Methyl Ethyl Ketone | — | 9.6 |

The above samples were farther let down according to the following formulas:

| Eastman CAB 381-2 BP | 3.6 |
|---|---|
| Butyl Acetate | 11.9 |
| Isopropanol | 2.0 |
| Methyl Isobutyl Ketone | 5.7 |
| Polyester Resin | 16.9 |
| Xylene | 27.3 |
| BYK 300 | 0.2 |
| Sample [A or B] | 32.9 |

RESULTS

Humidity adhesion at initial, 24 hours, 48 hours, 96 hours, and 240 hours. All passed with a 9–10 rating with 10 =best 0 =worst, 6 =failure.

Sprayouts showed the samples containing the amine functional cellulose ester resin of the invention (see Example 1) to be much more jet with less Solspere 24000 than control.

The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinent to the practice of this invention.

We claim:

1. A method of dispersing a pigment in a resin, comprising providing at least one amine functional cellulose ester resin comprising at least one repeating unit of the structure:

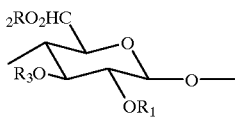

wherein $R_1$, $R_2$, and $R_3$ are selected independently from the group consisting of hydrogen, $R_4C=O$, and

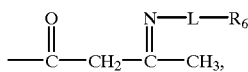

wherein
at least one of $R_1$, $R_2$, and $R_3$ is hydrogen,
at least one of $R_1$, $R_2$, and $R_3$ is $R_4C=O$, and
at least one of $R_1$, $R_2$, and $R_3$ is

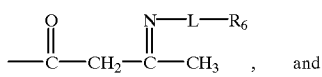

, and $R_4$ is selected from the group consisting of $C_4$–$C_{20}$ alkyl groups, $C_1$–$C_{20}$ phenyl groups, $C_1$–$C_{20}$ napthyl groups, and $C_1$–$C_{20}$ alkenyl groups, $R_6$ is selected from the group consisting of H and groups having at least one secondary amine group, tertiary amino group, and mixtures thereof, and L is a divalent linking group having from 1 to 20 carbons atoms and from 0 to 10 heteroatoms selected from the group consisting of oxygen, nitrogen, and mixtures thereof, and subjecting at least one pigment to an action to reduce the average particle size of the pigment in the presence of said at least one amine functional cellulose ester resin.

2. The method of claim 1 wherein the at least one pigment is selected from the group consisting of carbon black and transparent oxides.

3. The method of claim 2 wherein the at least one pigment is carbon black.

4. The method of claim 1 wherein $R_4$ is selected from the group consisting of $C_1$–$C_{10}$ alkyl groups.

5. The method of claim 4 wherein $R_4$ is selected from the group consisting of $C_2$–$C_6$ alkyl groups and mixtures thereof.

6. The method of claim 4 wherein the amine functional compound is selected from the group consisting of 1-(2-aminoethyl)piperazine and 4-(2-aminoethyl)morpholine.

7. The method of claim 1 wherein the pigment is subjected to grinding.

8. A pigment dispersion comprising
at least one pigment which has been subjected to an action to decrease the average particle size of the pigment in the presence of an amine functional cellulose ester, the amine functional cellulose ester comprising
at least one repealing unit of the structure:

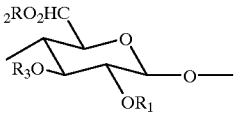

wherein $R_1$, $R_2$, and $R_3$ are selected independently from the group consisting of hydrogen, $R_4C=O$, and

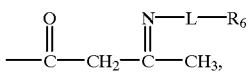

wherein
at least one of $R_1$, $R_2$, and $R_3$ is hydrogen,
at least one of $R_1$, $R_2$, and $R_3$ is $R_4C=O$, and
at least one of $R_1$, $R_2$, and $R_3$ is

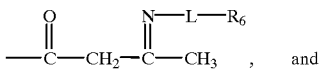

, and $R_4$ is selected, from the group consisting of $C_1$–$C_{20}$ alkyl groups, $C_1$–$C_{20}$ phenyl groups, $C_1$–$C_{20}$ napthyl groups, and $C_1$–$C_{20}$ alkenyl groups, $R_6$ is selected from the group consisting of H and groups having at least one secondary amine group, tertiary amine group, and mixtures thereof, and L is a divalent linking group having from 1, to 20 carbons atoms and from 0 to 10 heteroatoms selected from the group consisting of oxygen, nitrogen, and mixtures thereof.

9. A method of making a coating composition having an improved appearance, the method comprising
providing at least one pigment dispersion comprising at least one pigment which bas been subjected to an action to decrease the average particle size of the pigment in the presence of an amine functional cellulose ester, the amine functional cellulose ester comprising at least one repeating unit of die structure:

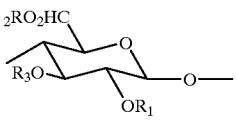

wherein $R_1$, $R_2$, and $R_3$ are selected independently from the group consisting of hydrogen, $R_4C=O$, and

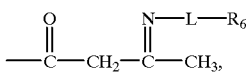

wherein
at least one of $R_1$, $R_2$, and $R_3$ is hydrogen,
at least one of $R_1$, $R_2$, and $R_4$ is $R_4C=O$, and at least one of $R_1$, $R_2$ and $R_3$ is

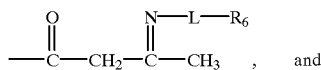, and $R_4$ is selected from the group consisting of $C_1$–$C_{20}$ alkyl groups, $C_1$–$C_{20}$ phenyl groups, $C_1$–$C_{20}$ napthyl groups, and $C_1$–$C_{20}$ alkenyl groups, $R_6$ is selected from the group consisting of H and groups having at least one secondary amine group, tertiary amine group, and mixture thereof, and L is a divalent linking group having from 1 to 20 carbons atoms and from, 0 to 10 heteroatoms selected from the group consisting of oxygen, nitrogen, and mixtures thereof, and incorporating the pigment dispersion with at least one binder to provide a coating composition.

10. A method of improving the appearance of a cured pigment coating, comprising applying a coating comprising at least one pigment dispersion comprising at least one pigment which has been subjected to an action to decrease the average particle size of the pigment in the presence of an amine functional cellulose ester, the amine functional cellulose ester comprising at least one repeating unit of the structure:

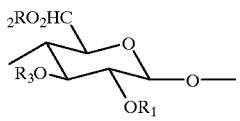

wherein $R_1$, $R_2$, and $R_3$ are selected independently from the group consisting of hydrogen, $R_4C\!\!=\!\!O$, and

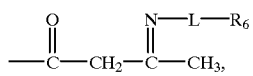

wherein
at least one of $R_1$, $R_2$, and $R_3$ is hydrogen,
at least one of $R_1$, $R_2$, and $R_3$ is $R_4C\!\!=\!\!O$, and
at least one of $R_1$, $R_2$, and $R_3$ is

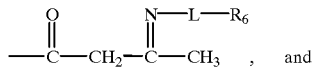, and $R_4$ is selected from the group consisting of $C_1$–$C_{20}$ alkyl groups, $C_1$–$C_{20}$ phenyl groups, $C_1$–$C_{20}$ naphthyl groups, and $C_1$–$C_{20}$ alkenyl groups, $R_6$ is selected form the group consisting of H and groups having at least one secondary amine group, tertiary amine group, and mixtures thereof, and L is a divalent linking group having from 1 to 20 carbons atoms and from 0 to 10 heteroatoms selected from the group consisting of oxygen, nitrogen, and mixtures thereof.

11. The method of claim 10 wherein the coating composition is cured.

12. A coating comprising at least one pigment dispersion comprising at least one pigment which has been subjected to an action to decrease the average particle size of the pigment in the presence of an amine functional cellulose ester, the amine functional cellulose ester comprising at least one repeating unit of the structure.

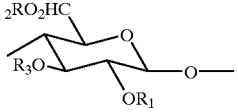

wherein $R_1$, $R_2$, and $R_3$ are selected independently from the group consisting of
hydrogen, $R_4C\!\!=\!\!O$, and

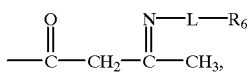

wherein
at least one of $R_1$, $R_2$, and $R_3$ is hydrogen,
at least one of $R_1$, $R_2$, and $R_3$ is $R_4C\!\!=\!\!O$, and
at least one of $R_1$, $R_2$, and $R_3$ is

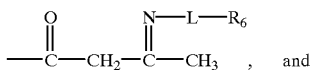, and $R_4$ is selected from the group consisting of $C_1$–$C_{20}$ alkyl groups, $C_1$–$C_{20}$ phenyl groups, $C_1$–$C_{20}$ napthyl groups, and $C_1$–$C_{20}$ alkenyl groups, $R_6$ is selected from the group consisting of H and groups having at least one secondary amine group, tertiary amine group, and mixtures thereof, and L is a divalent linking group having from 1 to 20 carbons atoms and from 0 to 10 heteroatoms selected from the group consisting of oxygen, nitrogen, and mixtures thereof.

* * * * *